Patented July 15, 1941

2,249,581

UNITED STATES PATENT OFFICE 2,249,581

NONPOISONOUS CARBURIZING LIQUID BATH

Haig Solakian, New Haven, Conn., assignor to Artemas F. Holden, New Haven, Conn.

No Drawing. Application November 30, 1938, Serial No. 243,119

6 Claims. (Cl. 148—30)

The present invention relates to metallurgy and more especially to a heat treatment liquid bath for ferrous materials, such as iron, steel, and various alloys of iron.

An object of the present invention is a nonpoisonous heat treatment liquid bath for ferrous work, which bath is adapted to economically and quickly carburize the work being treated without danger to the operator.

Heretofore in the art of liquid carburizing baths for heat treatment of ferrous work, the very poisonous material, sodium cyanide, has been the fundamental ingredient for providing the necessary carbon. In the present bath, the necessary carbon is provided by silicon carbide (SiC) which is totally non-poisonous.

This compound, silicon carbide, is of an acidic nature, and, therefore, reacts chemically with compounds of a basic nature. Silicon carbide heated in the presence of a basic salt reacts to form a silicate and releases the necessary carbon in such form as to carburize the work. For example, any carbonate of sodium, potassium, barium, magnesium, strontium, calcium or lithium when heated with silicon carbide will react to form a silicate and liberate the carbon from the silicon carbide. Sodium, potassium, barium, magnesium, strontium, calcium, and lithium carbonates are salts which may be designated herein as "R" carbonates ($RCO_3$), and when these salts are heated together with silicon carbide, the reaction becomes an "R" silicate and carbon ($RSiO_3$ and C).

The speed of the release of the carbon is dependent upon temperature, amount of silicon carbide present in the bath and the grain size of the silicon carbide. The silicon carbide does not melt in the bath but is attacked chemically by the basic salt and the finer the grain of the silicon carbide, the greater will be the area for a given weight of silicon carbide which is attacked by the basic salt, therefore, the finer the grain of the silicon carbide the more rapid will be the reaction. The reaction product of the basic salt and the silicon carbide, namely, a silicate, melts in the bath.

While the "R" group of carbonates will react as specified to produce the results required, certain of these salts are preferable for practical reasons over others of the salts, for example, sodium, potassium, or barium carbonates are preferable to carbonates of the other elements for the reason that the by-product silicates of sodium, potassium, or barium are readily soluble in water and, therefore, may be easily washed from the finished work, whereas, for example, if calcium carbonate is used the resulting calcium silicate is substantially insoluble in water and is very difficult to wash from the heat treated work.

More specifically, the preferred bath is one comprising silicon carbide, sodium carbonate, plus sodium chloride which is introduced into the bath for the purpose of making the bath more fluid.

Where the bath is to be used for carburization, the finer grain sizes of silicon carbide is preferable and it has been found that for relatively quick treatment of the work, as fine a grain size as will pass a three hundred mesh to the inch screen may be used. Preferably, however, for ordinary work, the grain size may be from such as will pass screens from fifty to one hundred and fifty meshes to the inches. A grain size which will pass a one hundred mesh to the inch screen is very satisfactory.

A satisfactory bath for carburizing may comprise by weight 45% of sodium chloride; 50% of sodium carbonate; and 5% of fine grain silicon carbide. It is to be understood, however, that these percentages and grain size are in no manner critical and may be varied to produce effects desired by increasing or decreasing the various relative sizes or percentages. During the working of the bath, the silicon carbide as such is destroyed, forming sodium silicate and carbon, and, therefore, it becomes necessary from time to time to replace the used up silicon carbide by the introduction of silicon carbide into the bath.

The reaction probably taking place when the bath is operating is that the silicon carbide breaks down into carbon and a silicate, and the carbon reacts with the oxygen of the atmosphere to form carbon monoxide and carbon dioxide which may in part react further with the released carbon to produce more carbon monoxide which in turn reacts with the ferrous work to carburize the same. The bath when operating may release some carbon dioxide gas which slowly bubbles up through the bath. Any carbon monoxide reaching the surface of the bath burns to carbon dioxide.

In the preferred bath, as above specified, where the percentages are given by weight, the rate of carbon penetration into ferrous work in a half hour at substantially 1600° F. is .008 inch and in one hour .015 inch. This indicates the present liquid bath carburizes as rapidly, or more rapidly, than the heretofore commonly used baths having the poisonous cyanide constituents.

The present bath may be satisfactorily operated at temperatures varying from 1400° F. to 1800° F., and, therefore, is a very flexible bath. Furthermore, the case produced by this bath is comparable to that produced by the treatment known in the art as "pack" carburizing. In the use of the present invention, however, the rate of carbon penetration is from three to four times more rapid than the "pack" carburizing treatment.

This bath may be modified by using silicon carbide in commercial form such as lumps or a small amount of silicon carbide of various grain size, to treat ferrous work without decarburizing the same, and without adding carbon to the work. Where the bath is used for heat treatment of work without change in carbon in the work, the silicon carbide is provided in such form or in such amount as to prevent the flow of carbon from the work at the temperature at which the work is being heat treated and without adding carbon to the work.

A very important advantage of the present bath is that it completely avoids the use, or the production while the bath is operating, of poisonous compounds either as solids or as gases. This bath contains no cyanide or other poisonous ingredients and no poisonous material is formed while the bath is in use, therefore, the bath is totally harmless and the fumes from the bath are simply carbon dioxide which is non-poisonous and non-irritating. This bath, therefore, may be used without elaborate auxiliary equipment to draw off poisonous fumes, as is necessary where the common type of posionous materials are used in heat treatment baths, and which poisonous baths release fumes of poisonous gases while the bath is operating.

Another advantage to the bath is the materials which stick to the work removed from the bath, are easily soluble in water and, therefore, the work may be quickly and easily cleaned by an ordinary washing bath of water.

What I claim is:

1. A heat treating liquid bath for ferrous work comprising in substantial amounts silicon carbide not in excess of 5% of the total weight of the bath and a basic salt which reacts with the silicon carbide to decompose the same and liberate the carbon therefrom at temperatures ranging substantially from 1400° F. to 1800° F.

2. A heat treating liquid bath for ferrous work comprising in substantial amounts silicon carbide not in excess of 5% of the total weight of the bath and a carbonate which reacts with the silicon carbide to form a silicate and liberate the carbon from the silicon carbide at temperatures ranging substantially from 1400° F. to 1800° F.

3. A heat treating liquid carburizing bath for ferrous work comprising in substantial amounts silicon carbide not in excess of 5% of the total weight of the bath and an "R"-carbonate to form an "R"-silicate and liberate the carbon necessary for carburizing the ferrous work at temperatures ranging substantially from 1400° F. to 1800° F.

4. A heat treating non-poisonous carburizing liquid bath for ferrous work comprising in substantial amounts silicon carbide not in excess of 5% of the total weight of the bath and sodium carbonate to form sodium silicate and liberate the necessary carbon for carburizing the ferrous work at temperatures ranging substantially from 1400° F. to 1800° F.

5. A heat treating non-poisonous liquid bath for carburizing ferrous work comprising substantially 5% silicon carbide, substantially 50% sodium carbonate, and substantially 45% sodium chloride, to form sodium silicate and sodium chloride and to liberate the carbon necessary to carburize the ferrous work at temperatures ranging substantially from 1400° F. to 1800° F.

6. A heat treating non-poisonous liquid bath for carburizing ferrous work comprising a substantial amount of silicon carbide having a grain size such as to pass through screens ranging from fifty to three hundred meshes per inch, said silicon carbide not in excess of 5% of the total weight of the bath, and a substantial amount of an "R"-carbonate to form an "R"-silicate and liberate the carbon necessary to carburize the ferrous work at temperatures ranging substantially from 1400° F. to 1800° F.

HAIG SOLAKIAN.